Jan. 7, 1958
J. J. RUSSELL
2,818,878
MIXING VALVE AND SWING FAUCET
Filed Dec. 24, 1953
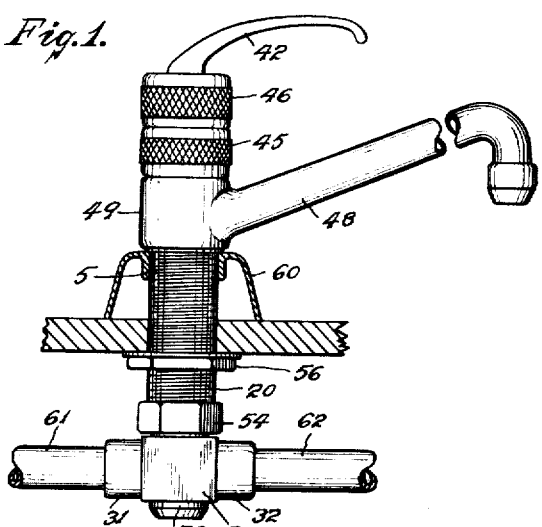
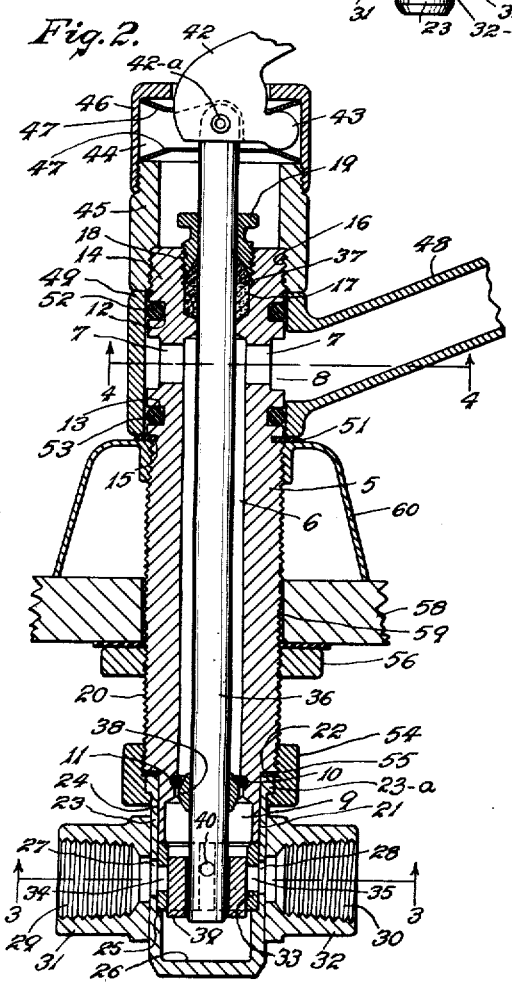
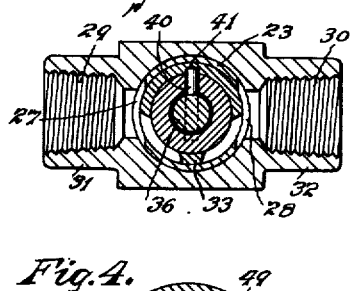
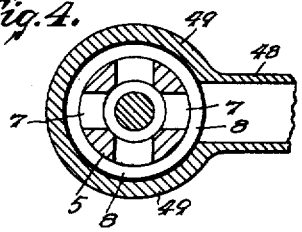
INVENTOR.
JOHN J. RUSSELL
BY
*Louis V. Lucia*
ATTORNEY.

ated Jan. 7, 1958

2,818,878

MIXING VALVE AND SWING FAUCET

John J. Russell, Bellerose, N. Y.

Application December 24, 1953, Serial No. 400,316

2 Claims. (Cl. 137—359)

This invention relates to a mixing valve and swing faucet and more particularly to a device such as fully described in my co-pending application Serial No. 360,447, filed June 9, 1953.

It is an object of the present invention to provide such a mixing valve and swing faucet of an improved construction which will materially reduce the cost of manufacture.

A further object of this invention is to provide such a construction for which most of the parts may be produced in standard machines, such as screw machines and the like, and thereby reducing the cost of manufacture while at the same time increasing the durability of the device.

A still further object of the invention is to provide such a device which is easier to install.

Further objects and advantages of this invention will be more clearly understood from the following description and the accompanying drawings in which:

Fig. 1 is a front view, partly in section, of a combined swing faucet and mixing valve embodying the present invention.

Fig. 2 is an enlarged side view of the same in central vertical section.

Fig. 3 is a sectional view on line 3—3 of Fig. 2.

Fig. 4 is a sectional view on line 4—4 of Fig. 2.

In the embodiment of the invention which is illustrated in the drawings, the numeral 5 denotes the body of the mixing valve which is elongated and of tubular form. The said body has an axial bore 6 extending upwardly therein for a portion of its length and communicating with radial openings 7—7 extending through the wall of said body from the bottom of an annular groove 8 in the outer surface thereof.

The lower end of said bore 6 has an enlarged portion 9 opening at the lower end of the body 5 and an annular groove 10 is formed in the inner wall of the said bore 6 and adjacent the portion 9 to receive a suitable resilient ring 11 which forms a valve seat inside of the bore 6.

The exterior of the body 5 is also provided with annular grooves 12 and 13 adjacent the opposite sides of and parallel to the annular groove 8 and the said exterior is further provided with an annular slot 15 for the purpose to be hereinafter described.

Above the groove 12, the upper portion 14 of the body 5 is threaded, as at 16, and a packing recess 17 is formed in the upper end of said body and has a threaded portion at 18 to receive a packing nut 19.

The lower portion of the exterior of the said body is threaded, as at 20, and the lower end portion thereof has a reduced diameter at 21 which provides an annular shoulder 22.

A mixing valve unit is connected to the lower end of the body 5 and includes a cup-shaped member 23 which has a central recess 24 in which is received the said reduced diameter of the body 5. Said recess has an annular shoulder 25 therein that is preferably spaced from the bottom 26 thereof. Adjacent to said annular shoulder, the said member 23 has openings 27 and 28 extending through its opposite sides and communicating with the central recess 24 and with threaded recesses 29 and 30, within radial projections 31 and 32, respectively, that extend from a block 32-a which fits snugly over the member 23 and is attached thereto by sweating or soldering.

A valve bushing 33 is rotatably contained within the recess 24 and rests upon the annular shoulder 25. This bushing has radial openings 34 and 35 which are adapted to communicate respectively with the openings 27 and 28 in the member 23.

A valve stem 36 extends longitudinally through the body 5 and through the bore 6 and recess 17 therein. The said stem is of a diameter smaller than the diameter of the bore 6 so as to provide a passage between the stem and the inner wall of the said bore and a packing gland 37 surrounds the said stem in the recess 17 to prevent leakage between the stem and the portion of the body above the bore 6.

At the lower portion of the stem 36 there is provided a metallic collar 38 which is secured to the stem 36, by brazing or the like, and provides a valve plug cooperating with the valve seat member 11 to control the flow of fluid into the passage between the stem and the inner wall of the bore 6.

At the lower end of the said stem there is provided a valve piston 39 which is secured to the stem by means of a pin 40 that extends into a slot 41 in the inner wall of the bushing 33 and provides a sliding connection between the said piston and the bushing 33.

The upper end of the stem 36 is secured to an operating lever 42 which is pivotally connected to the stem by means of a pin 42-a and has a projection 43 that fulcrums said lever in an annular groove 44 that is provided between a supporting sleeve 45, which is threaded to the thread 16 at the upper end of the body 5, and a cap nut 46 that is threaded to the upper portion 47 of the said sleeve 45. Bearing washers 47—47 are provided within said annular groove 44 and are preferably cup-shaped to make them resilient and thereby take up looseness between the extension 43 and the adjacent walls of the annular groove 44.

A swing spout 48 is rotatably mounted over the exterior of the body 5 and has a hub portion 49 which surrounds the body portion and is rotatable thereon over a positioning ring 51 which is inserted within the groove 15. The said spout is rotatably sealed to the body, to prevent leakage, by means of annular packing rings 52 and 53 which are inserted into the annular grooves 12 and 13.

In order to secure the valve unit to the bottom portion of the body 5, the member 23 is formed with a flange 23-a which extends into a thimble nut 54 that is threaded to the thread 20 of the body to draw the casing up against the shoulder 22 and thereby securely connect the mixing valve unit to the body member and against the shoulder 22 with a rigid, leak-proof connection. If desired, a sealing washer 55 may be provided between said shoulder and the upper free edge of the casing.

As shown, a suitable mounting nut 56 is threaded to the thread 20 for mounting the valve and spout in operative position upon a separate member, such as a portion of a kitchen sink, indicated at 58, and a suitable escutcheon 60 is also threaded to the thread 20 and covers the portion of the body below the spout for enhancing the appearance of the device.

When the above described mixing valve and swing spout is to be mounted for use in the position shown in Fig. 1, the mixing valve unit is first detached from the lower portion of the body 5, by unscrewing the nut 54, and the nut 56 is also removed. The lower end of said body is then inserted through the opening 59 in the sink portion 58 and the nut 56 is then turned on the thread 20 and brought into firm engagement with the bottom of the portion 58 to thus securely mount the body in position. The valve unit is then slipped over the reduced diameter 21 of the body, as the piston 39 is inserted into the bushing 33, and the nut 54 is screwed onto the thread 20 and tightened to firmly attach the valve unit to the body 5 as clearly shown in Fig. 2.

After the valve unit is thus attached, the hot and cold water supply pipes 61 and 62, respectively, are secured to the projections 31 and 32, as clearly shown in Fig. 1, and the combination mixing valve and swing spout are ready for use.

The said device is operated by first raising the lever 42 and thereby causing the valve plug 38 to be moved away from the seat 11. This will also lower the piston 39 so that the hot and cold water will flow through the ports 34 and 35 into the bore 6 and from there through the spout 48. The lever 42 may then be rotated to rotate the bushing 33 and thereby control the flow of hot and cold water through the ports 34 and 35 until the desired water temperature is obtained and the volume of the water flow may be controlled by raising or lowering the operating lever 42. When it is desired to shut off the water completely, the said lever may be lowered to bring the valve plug 38 against the valve seat. When the said lever is again raised the water will immediately flow at the temperature at which it was previously adjusted. Therefore, the rotation of the operating lever will adjust the temperature of the water and raising or lowering of said lever will control the volume of the flow of said water without changing its temperature.

It will be clearly understood from the above description that the construction provided by my present invention greatly simplifies the combination mixing valve and swing spout and adapts most of the parts thereof for economical manufacture on standard machines; thus materially reducing the cost thereof and, at the same time, rendering the device much easier to install.

I claim:

1. A mixing valve including an elongated tubular body having an axial bore therein and a threaded exterior surface, a valve seat within said bore, a valve stem longitudinally slidable within said bore and spaced from the inner wall of the bore to provide a passage therein, radial discharge passages in said body communicating with said bore, a valve plug member on said stem cooperating with the valve seat in the bore, an operating lever pivotally connected to said stem and fulcrumed to longitudinally move the stem, mounting means cooperating with the thread on the body member for mounting the said valve on a separate member, a mixing valve unit including a cup-shaped member having a recess therein and a valve sleeve rotatable in said recess, the said sleeve having radial ports therein and the said cup-shaped member having radial openings disposed to register with the said ports in the sleeve, the recess in the said cup-shaped member being adapted to receive a reduced portion at the end of the body member and the said reduced portion being adapted to longitudinally position the said sleeve in the said cup-shaped member, a piston secured to the end of the valve stem and slidably fitting within the sleeve and the said member, means slidably securing the sleeve to the piston to cause rotation of the sleeve and permit axial sliding movement of the piston within the sleeve, and means including a nut carried on said unit and fitting the thread of said body for detachably attaching the said unit to the lower end portion of the body.

2. A mixing valve including an elongated tubular body member having an axial bore therein, a valve seat in said bore, a valve stem slidable through said body member and of a lesser diameter than the said bore to thereby provide a passage between said stem and the wall of the bore, a radial opening in the wall of said body member communicating with said passage, an annular groove in the exterior of the body member communicating with said radial opening, a swing spout having a hub portion surrounding the said body member and a passage communicating with the said member annular groove, an escutcheon member covering a portion of said body member below the hub portion of the swing spout, an external screw thread surrounding the lower portion of the body member, a nut threaded to the said screw thread for mounting the body member to a separate member by securing said separate member between the said nut and escutcheon member, a lower end portion of the said body member being of a reduced diameter providing an annular shoulder, a mixing valve unit including a cup-shaped member having a recess therein fitting the said reduced diameter and a free edge adapted to seat against the said annular shoulder, means for securing the said mixing valve unit to the body member including a nut attached to said unit and threaded to the screw thread adjacent the lower end of the body member for drawing said unit into seated position against the said annular shoulder, the said mixing valve unit including a rotatable sleeve, the said reduced portion of the body member longitudinally retaining said sleeve in position within the said cup-shaped member, a valve piston secured to the lower end of the said valve stem and slidable within the valve sleeve, the said stem being slidably connected to the valve sleeve for rotating it, and an operating lever connected to the upper end of the valve stem for applying rotary and sliding movements thereto.

References Cited in the file of this patent

UNITED STATES PATENTS

| 1,562,981 | Muend | Nov. 24, 1925 |
| 2,083,360 | Brinkman | June 8, 1937 |
| 2,373,702 | Moen | Apr. 17, 1945 |
| 2,608,378 | Hinderer | Aug. 26, 1952 |
| 2,609,206 | Moen | Sept. 2, 1952 |
| 2,644,483 | Parker | July 7, 1953 |